United States Patent Office 2,721,219
Patented Oct. 18, 1955

2,721,219

PRODUCTION OF OXIMES

Harry Welz, Krefeld, Germany, assignor to Farbenfabriken Bayer Aktiengesellschaft, Leverkusen, Germany, a corporation of Germany No Drawing. Application December 5, 1951,
Serial No. 260,093

Claims priority, application Germany December 9, 1950

12 Claims. (Cl. 260—566)

The present invention relates to the production of oximes by reduction of salts of nitro alkanes.

It is known to prepare oximes by reducing alkali metal salts of primary or secondary nitro compounds of the aliphatic or cycloaliphatic series with stannous chloride in hydrochloric acid solution.

I have now found that the preparation of oximes from the alkali metal or alkaline earth metal salts of nitro alkanes the nitro group of which is connected with a carbon atom carrying at least one hydrogen atom, i. e. primary or secondary nitro alkanes of this kind is not solely dependent on the application of stannous chloride as a reducing agent but that the said salts may be reduced in a technically simple manner in an acid solution by means of metals above tin in the displacement series, in the presence of an amount of stannous chloride which is insufficient for the reduction of the nitro alkanes. This process characterises the present invention.

In the process, practically only the metal is consumed for the reduction, while the stannous chloride remains essentially unchanged. Preferably an amount of stannous chloride of the order of about 1% to about 10% and especially of about 3% to about 5% of that theoretically sufficient for the reduction of the nitro alkanes is used. If the said metal is used in excess, tin is cemented on the surface of the excess metal but it is easily reconvertible into stannous chloride. If however no excess is used, the stannous chloride remains practically unchanged.

In working up the reaction mixture generally by adding a neutralising agent, the stannous chloride is converted into stannous hydroxide, from which stannous chloride can be easily recovered in the known manner. On the other hand, in the prior process in which stannous chloride is used exclusively as reducing agent, it is a more complicated procedure to separate the resultant tin tetrachloride from the reaction mixture and to reconvert it into stannous chloride.

The above mentioned alkali metal or alkaline earth metal salts of the said nitro alkanes e. g. the sodium, potassium, lithium, calcium, barium or strontium salts can be easily obtained, in a manner known per se by reacting the nitro alkanes with the corresponding alkali metal or alkaline earth metal hydroxides.

Among the metals used as reducing agents according to the invention, nickel, cobalt, thallium, cadmium and especially iron, zinc, aluminium and magnesium may be particularly mentioned.

As nitro alkanes the nitro group of which is connected with a carbon atom carrying at least one hydrogen atom can be used for example aliphatic mononitro alkanes such as nitroethane, 2-chloro-1-nitroethane, 1-nitropropane, 2-chloro-1-nitropropane, 2-nitropropane, 1-chloro-2-nitropropane, 1-nitrobutane, 2-nitrobutane, 1-nitropentane, 2-nitropentane, 2-nitrohexane, 1-nitrononane, 1-nitro-2,7-dimethyloctane, 1-nitroundecane and the mononitro alkanes obtainable by nitration of the alkanes of the Fischer-Tropsch synthesis, cycloaliphatic mononitro alkanes such as nitrocyclohexane, 2-nitro-1-methylcyclohexane, 3-nitro-1-methylcyclohexane, 1-nitrodecahydronaphthalene and 2-nitro-decahydronaphthalene, polynitro alkanes such as 1,1-dinitroethane, 1,2-dinitroethane, 1,1-dinitropropane, 1,2-dinitropropane, 1,1-dinitrobutane, 2,3-dinitrobutane, 1,4-dinitrobutane, 1,1-dinitropentane, 1,5-dinitropentane, 2,3-dinitro-2-methylbutane and the polynitro alkanes obtainable by nitration of the alkanes of the Fischer-Tropsch synthesis, finally cycloaliphatic polynitro alkanes such as 1,2-dinitrocyclohexane, 1,3-dinitrocyclohexane and 1,4-dinitrocyclohexane.

Generally the reaction may be performed in the temperature range above the freezing point and below the decomposition point of the reaction components the best results being obtained in the temperature range of about 0° to about 50° and particularly of about 0° to about 30°.

The following examples are given to illustrate the process of the invention:

Example 1

A solution of 65 grams of nitroethane in 450 grams of a 10% caustic soda solution and 30 grams of powdered aluminium are added to a solution of 7 grams of stannous chloride (i. e. 3.6% of the amount theoretically required for the reduction of the nitroethane) in 90 grams of 5% hydrochloric acid in the course of an hour while stirring vigorously. By adding hydrochloric acid during the conversion, an excess of acid is constantly maintained. The reaction temperature is kept at 20° C. After the conversion is completed, the reaction mixture is adjusted to pH 4 with a 10% solution of caustic soda, and is subsequently extracted with benzene. The benzene solution, after distillation, yields 44 grams of acetaldoxime (86% of the theoretical).

Example 2

A solution of 129 grams of nitrocyclohexane in 450 grams of a 10% solution of caustic soda and 85 grams of zinc dust are added to a solution of 16 grams of stannous chloride (i. e. 7% of the amount theoretically required for the reduction of the nitrocyclohexane) in 100 grams of 5% hydrochloric acid in the course of an hour while stirring vigorously. By adding hydrochloric acid during the conversion, an excess of acid is constantly maintained. The reaction temperature is kept at 20° C. by cooling. After the conversion is completed, the reaction mixture is adjusted to pH 2 with a 10% solution of caustic soda, and the zinc in excess is filtered off. All of the tin is precipitated on the surface of the zinc. The filtrate is brought to pH 5 by addition of a caustic soda solution. Thereby, the major part of the oxime precipitates. The precipitate is filtered off and dried. Small amounts of cyclohexanone oxime, cyclohexanone and cyclohexanol are dissolved in the filtrate which are recovered by extraction with benzene and separated by vacuum distillation. The yields are: 99 grams of cyclohexanone oxime (88% of the theoretical), 2 grams of cyclohexanone and 6 grams of cyclohexanol.

Example 3

A mixture of 129 grams of nitrocyclohexane, 35 grams of calcium oxide and 400 ccm. of water, furthermore 28 grams of powdered magnesium are added to a solution of 8 grams of stannous chloride (i. e. 5.0% of the amount theoretically required for the reduction of the nitrocyclohexane) in a 100 grams solution of 5% hydrochloric acid in the course of an hour while stirring vigorously. By adding hydrochloric acid during the conversion an excess of acid is constantly maintained. The reaction temperature is kept at 15° C. by cooling. After the conversion is completed, the reaction mixture is neutralized with a 10% solution of caustic soda and the resulting precipitation consisting of oxime and stannous hydroxide is filtered off. The oxime is then extracted from the precipitate by means of benzene. Small amounts of cyclohexanone oxime, cyclohexanone and cyclohexanol are in the filtrate which may be recovered by extraction with benzene. After distillation of the benzene 97 grams of cyclohexanone oxime (88% of the theoretical), 4 grams of cyclohexanone and 5 grams of cyclohexanol are obtained by vacuum distillation.

*Example 4*

A solution of 148 grams of 2,3-dinitrobutane in 1260 grams of a 10% solution of caustic potassium and 85 grams of zinc dust are added to a solution of 8 grams of stannous chloride (i. e. 3.5% of the amount theoretically required for the reduction of the 2,3-dinitrobutane) in 100 grams of 5% hydrochloric acid in the course of an hour while stirring vigorously. By adding hydrochloric acid during the conversion an excess of acid is constantly maintained. The reaction temperature is kept at 10° C. by cooling. After the conversion is completed the reaction mixture is adjusted to pH 2 with a 10% solution of caustic potassium and the zinc dust not converted is filtered off. All the tin is precipitated on the surface of the zinc. The filtrate is adjusted to pH 5 with a solution of caustic potassium. Thereby the butanedioxime-(2,3) is precipitated. It is filtered off and dried. Yield: 79 grams of butanedioxime-(2,3) (69% of the theoretical).

I claim:

1. A process for the production of oximes, which comprises treating at a temperature from −10 to 80° C. in an acid solution a salt selected from the group consisting of the alkali metal and alkaline earth metal salts of nitro alkanes and nitro cycloalkanes whose nitro groups are connected to carbon atoms carrying at least one hydrogen atom with a metal above tin in the displacement series in the presence of an amount of stannous chloride of the order of about 1% to 10% of that theoretically being necessary for the reduction of the nitro alkane to the oxime.

2. A process for the production of oximes, which comprises treating at a temperature from −10 to 80° C. in an acid solution an alkali metal salt of a mononitro alkane whose nitro group is connected to a carbon atom carrying at least one hydrogen atom with a metal above tin in the displacement series in the presence of an amount of stannous chloride of the order of about 1% to 10% of that theoretically being necessary for the reduction of the nitro alkane to the oxime.

3. A process for the production of oximes, which comprises treating at a temperature from −10 to 80° C. in an acid solution an alkali metal salt of a primary mononitro alkane with a metal above tin in the displacement series in the presence of an amount of stannous chloride of the order of about 1% to about 10% of that theoretically being necessary for the reduction of the nitro alkane to the oxime.

4. A process for the production of acetaldehyde oxime which comprises treating at a temperature from about −10 to 80° C. the sodium salt of nitro ethane dissolved in hydrochloric acid with aluminium in the presence of 3.6% of the amount of stannous chloride theoretically being necessary for the reduction of the nitro ethane to the oxime.

5. A process for the production of oximes by reduction of salts of organic nitro compounds which comprises treating at a temperature from −10 to 80° C. in an acid solution an alkali metal salt of a secondary mononitro alkane with a metal above tin in the displacement series in the presence of an amount of stannous chloride of the order of about 1% to about 10% of that theoretically being necessary for the reduction of the nitro alkane to the oxime.

6. A process for the production of oximes, which comprises treating at a temperature from −10 to 80° C. in an acid solution an alkali metal salt of a secondary mononitro cyclo alkane with a metal above tin in the displacement series in the presence of an amount of stannous chloride of the order of about 1% to about 10% of that theoretically being necessary for the reduction of the nitro alkane to the oxime.

7. A process for the production of cyclohexanone oxime which comprises treating at a temperature from about −10 to 80° C. the sodium salt of nitrocyclohexane dissolved in hydrochloric acid with zinc dust in the presence of 7% of the amount of stannous chloride theoretically being necessary for the reduction of the nitrocyclohexane to the oxime.

8. A process for the production of oximes, which comprises treating at a temperature from −10 to 80° C. in an acid solution an alkaline earth metal salt of a mononitro alkane whose nitro group is connected to a carbon atom carrying at least one hydrogen atom with a metal above tin in the displacement series in the presence of an amount of stannous chloride of the order of about 1% to 10% of that theoretically being necessary for the reduction of the nitro alkane to the oxime.

9. A process for the production of oximes, which comprises treating at a temperature from −10 to 80° C. in an acid solution an alkaline earth metal salt of a primary mononitro alkane with a metal above tin in the displacement series in the presence of an amount of stannous chloride of the order of about 1% to about 10% of that theoretically being necessary for the reduction of the nitro alkane to the oxime.

10. A process for the production of oximes, which comprises treating at a temperature from −10 to 80° C. in an acid solution an alkaline earth metal salt of a secondary mononitro alkane with a metal above tin in the displacement series in the presence of an amount of stannous chloride of the order of about 1% to about 10% of that theoretically being necessary for the reduction of the nitro alkane to the oxime.

11. A process for the production of oximes, which comprises treating at a temperature from −10 to 80° C. in an acid solution an alkaline earth metal salt of a secondary mononitro cyclo alkane with a metal above tin in the displacement series in the presence of an amount of stannous chloride of the order of about 1% to about 10% of that theoretically being necessary for the reduction of the nitro alkane to the oxime.

12. A process for the production of cyclohexanone oxime which comprises treating at a temperature from about −10 to 80° C. the calcium salt of nitro cyclohexane dissolved in hydrochloric acid with powdered magnesium in the presence of 5.0% of the amount of stannous chloride theoretically being necessary for the reduction of the nitro cyclohexane to the oxime.

References Cited in the file of this patent

UNITED STATES PATENTS 2,233,823   Susie _____ Mar. 4, 1941

OTHER REFERENCES

Goldschmidt et al.: Z. Physik Chem. 100, 197–202 (1922).

Johnson et al.: J. Am. Chem. Soc., vol. 61, 3194–5 (1939).

Konowaloff: M. Chem. Zent., 1899, I, 597–8.

Werner: Ind. and Eng. Chem., vol. 41, No. 9, September 1949, pp. 1844–5.